UNITED STATES PATENT OFFICE.

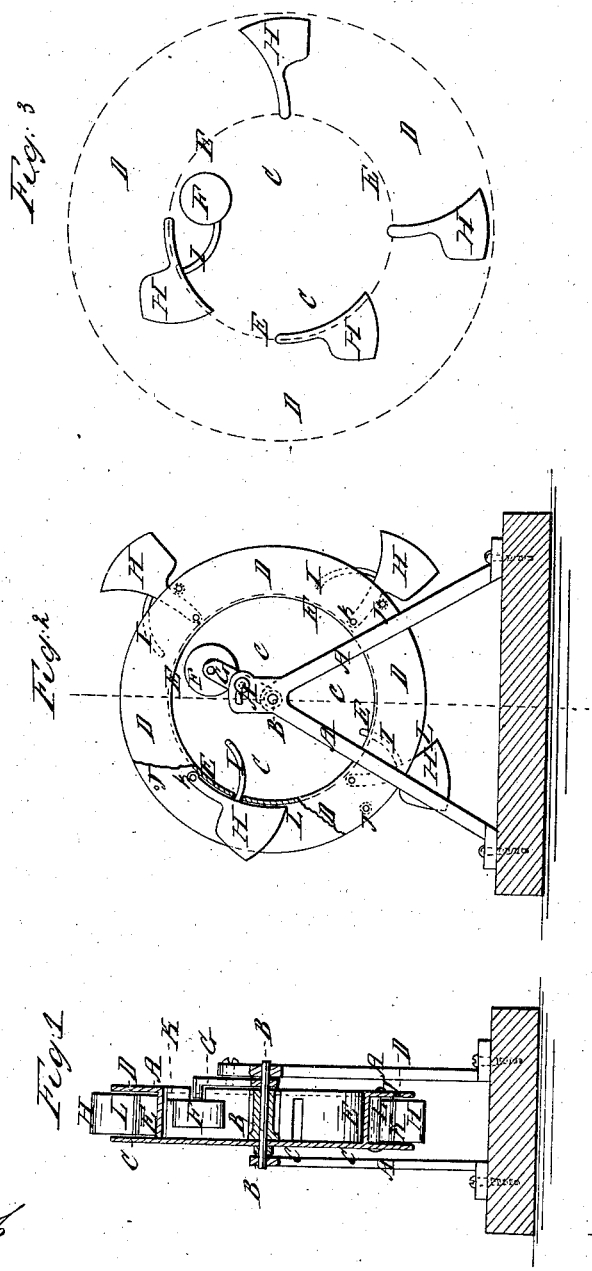

E. G. BUDD, OF BUDD'S LAKE, NEW JERSEY.

Letters Patent No. 65,539, dated June 11, 1867.

---

IMPROVEMENT IN WATER-WHEELS.

---

The Schedule referred to in these Letters Patent and making part of the same.

---

TO ALL WHOM IT MAY CONCERN:

Be it known that I, E. G. Budd, of Budd's Lake, in the county of Morris, and State of New Jersey, have invented a new and useful Improvement in Water-Wheels; and I do hereby declare that the following is a full, clear, and exact description of the construction and operation of the same, reference being had to the annexed drawings, making a part of this specification, in which—

Figure 1 is a perspective view.
Figure 2, a longitudinal elevation.
Figure 3, a transverse section—

And to the letters of reference marked thereon.

The description of my invention is as follows: A A, the frame; B, the shaft; C C C C, the supporting side of the wheel; D D D D, the quarter or inner side; E E E, the inner rim; F, the inner adjustable wheel; G, the arm attached to the frame; H H H H, in figs. 2 and 3, the revolving leverage buckets; I I I I, in fig. 2, the projecting levers attached to the buckets; J J J J, in fig. 2, the bolts binding the sides of the wheel, on which are rubber or gutta percha coverings; k k k k, fig. 2, the pivot-bolts connecting the buckets to the wheel, L, the space between sides C C C C and D D D D, and the inner rim E E E, for the leverage buckets to work in as the wheel revolves.

To enable others to make use of my invention, I will proceed to describe its construction and operation.

The frame A A, in working operation, can be constructed as all usual frames for overshot or breast water-wheels. The shaft B extends through the breast of the wheel and is bolted secure to side C C C C, the main support, to which D D D D, the quarter side, and E E E, the inner rim, are stoutly secured thereby, forming an inner space for the adjustable wheel F, attached to arm G. I I I I, the projecting levers attached to the buckets H H H H, and which pass through little apertures made in the inner rim E E E, so that the buckets H H H H swing by natural laws toward the diameter on the upward revolution of the wheel, and are thrown out by these levers passing over the adjustable wheel F, fig. 3, at the point, to gain the greatest downward force. These buckets receiving water overshot gain their leverage power. I cover the heavy bolts J J J J, conecting the sides of the wheel, and which also supports the leverage buckets in their horizontal position, with rubber or gutta-percha springs to ease the fall of the buckets in their revolutions. The buckets H H H H are hung on the pivot-bolts k k k k, adjoining in the inner rim E E E. The space L between the two sides and inner rim forms, also, overshot momentary buckets.

The construction of this water-wheel is such that it can be made of all cast iron, or iron and wood, or other metal; can be used overshot or breast; and on apppliaction of water I gain a powerful leverage power. On large constructions the leverage buckets, with projecting levers, can be increased in number and made of cast iron. The sides C C C C and D D D D and inner rim E E E may be of all cast iron, either united by bolts or in one casting, leaving necessary space for buckets and levers outwards, and space for the adjustable wheel and arm within.

As claim, I desire to secure by Letters Patent—

The wheel proper C C C C, D D D D, and E E E, and L, the leverage buckets H H H H, with levers I I I I, the adjustable wheel F, with arm G, constructed substantially as and for the purposes set forth.

E. G. BUDD.

Witnesses:
J. M. SHARP,
S. D. BUDD.